United States Patent [19]
Hansen

[11] 3,952,979
[45] Apr. 27, 1976

[54] ISOLATOR

[75] Inventor: Siegfried Hansen, Los Angeles, Calif.

[73] Assignee: Hughes Aircraft Company, Culver City, Calif.

[22] Filed: Feb. 19, 1975

[21] Appl. No.: 551,210

[52] U.S. Cl. ............................ 248/20; 188/1 B; 248/163; 248/358 R
[51] Int. Cl.² ........................................ F16F 15/04
[58] Field of Search ............... 188/1 B; 244/17.25, 244/17.27; 248/13, 20, 21, 22, 163, 358 R

[56] References Cited
UNITED STATES PATENTS

| | | | |
|---|---|---|---|
| 3,288,421 | 11/1966 | Peterson | 248/163 |
| 3,295,224 | 1/1967 | Cappel | 248/163 |
| 3,464,657 | 9/1969 | Bullard | 248/20 |
| 3,483,951 | 12/1969 | Bonesho et al. | 188/1 B |
| 3,577,659 | 5/1971 | Kail | 248/163 |
| 3,592,422 | 7/1971 | Norman | 248/20 |
| 3,701,499 | 10/1972 | Schubert et al. | 248/358 R |

*Primary Examiner*—James T. McCall
*Assistant Examiner*—Lawrence J. Staab
*Attorney, Agent, or Firm*—Allen A. Dicke, Jr.; William H. MacAllister, Jr.

[57] ABSTRACT

Isolation of a platform from a base is achieved by employing six supports therebetween which preferably comprise two sets of three mutually perpendicular supports. The supports can be varied in length by a motor to control the platform in all six degrees of freedom (three translational and three rotational) with respect to the base.

3 Claims, 4 Drawing Figures

ISOLATOR

BACKGROUND

This invention is directed to an isolator, and particularly a vibration isolator for isolating a platform from the vibrations of its base.

Much study and work have been directed to the isolation of a platform from the vibration of its base, Most of the vibration isolation has gone into passive efforts to damp and absorb energy and passively absorb vibrational displacements without affecting the position or stability of the platform.

Absorption of vibration can accomplish a great deal, but some displacement of the platform always results from such energy absorption. Thus, absolute stability is not achieved.

SUMMARY

In order to aid in the understanding of this invention, it can be stated in essentially summary form that it is directed to an isolator having a platform isolated from a base. Six interconnecting support elements connect the platform to the base. The support elements are angularly arranged with respect to each other, and are of controllable length so that the platform is controlled in all 6° of freedom with respect to the base.

It is thus an object of this invention to provide an isolator whereby a platform is isolated from the base. It is another object to provide an isolator whereby both translational and rotational isolation are achieved. It is yet another object to provide an isolator whereby supports interconnect the platform to the base, and the supports are of controllable length to be able to control the platform with respect to the base in 6° of freedom and are powered to control the platform with respect to the base so that the platform is stationary while the base vibrates. It is a further object of this invention to provide a sensor which senses vibration and a servomechanism which positively powers the platform with respect to the base in accordance with sensed motion to isolate the platform from motion of the base.

Other objects and advantages of this invention will become apparent from a study of the following portion of this specification, the claims, and the attached drawings.

DESCRIPTION OF THE PREFERRED EMBODIMENT

Figure 1:
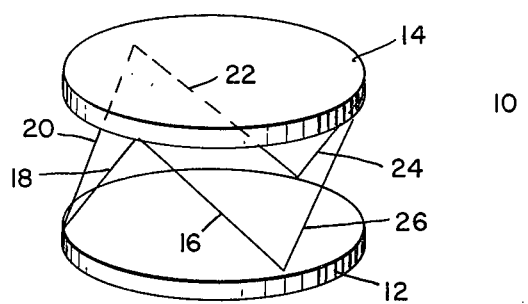
FIG. 1 is a schematic view of the vibration isolator of this invention.

Vibration isolator 10 has a base 12 which serves as a mounting base of the structure. It has a platform 14 which is to be isolated from the base and carries any load or device which is to be isolated from vibration of the base. Six individual support members 16, 18, 20, 22, 24 and 26 interconnect the base and platform and support the platform with respect to the base. Furthermore, they isolate the platform from vibrations of the base by the means described hereinafter. Base 12 is secured to an available foundation.

Support members 16 through 26 have central axes which intersect each other and which are mutually perpendicular at their intersections. Thus, the axis of each of the support members is perpendicular to the adjacent axes which it intersects, and the axis of each of the support members is parallel to the axis of the opposite support member. For example, support members 18 and 26 are perpendicular to support member 16, while support member 22 is parallel to support member 16. Similarly, support member 24 is parallel to support member 18, and support member 20 is parallel to support member 26. Thus, in each pair the support members are parallel.

Figure 2:
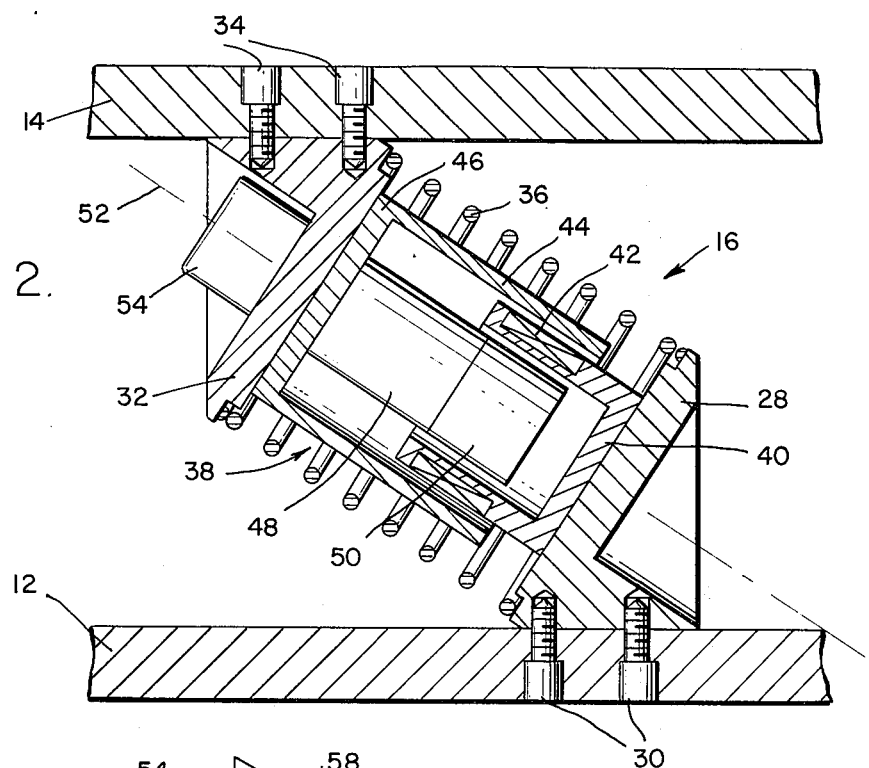
FIG. 2 is a longitudinal section through one of the support elements with portions of the associated platform and base being broken away.

FIG. 2 shows a longitudinal section through support member 16. The other support members are of the same construction, and this illustration is illustrative of all of the support members. Base bracket 28 is secured to base 12 by means of screws 30, while a similar platform bracket 32 is secured to platform 14 by means of screws 34. Spring 36 is inter-engaged between the brackets and seats in spring pockets in each of the brackets. Spring 36 is a compression spring and is held in a state of compression by means of the weight of the platform and force motor 38 which is positioned between the brackets and inside the spring. Coil form 40 carries electric coil 42 and is secured to base bracket 28, so that the coil is secured with respect to the base bracket. Coil form 40 is of non-magnetic material. Shell 44 is in the form of a cylindrical cup which engages around the outside of coil 42. Shell 44 is of magnetic material and has its end 46 secured to platform bracket 32. Permanent magnet 48 is mounted to the end 46 of shell 44 and extends toward coil 42. Magnetic pole piece 50 is mounted on magnet 48 and is positioned within coil 42. A magnetic circuit is thus formed through shell 44, end 46, magnet 48, pole piece 50, and coil 42. By controlling the energization of coil 42, repulsion or attraction of bracket 32 with respect to bracket 28 can be accomplished. This type of motor has bipolar response, so bias is not required. Platform 14 is supported by springs 36 and with positive or negative energization of coil 42 the total supporting force of that motor is changed. Energization is controlled positive or negative by the power supply to control the force motor. Furthermore, the structure is designed so that, with a nominal weight on platform 14 and no energization of coil 42, the entire structure lies around the axis of the support member. The axis is the diagramatic illustration of the support member in FIG. 1 and is shown at 52 in FIG. 2. Each of the support members is similar.

Figure 3:
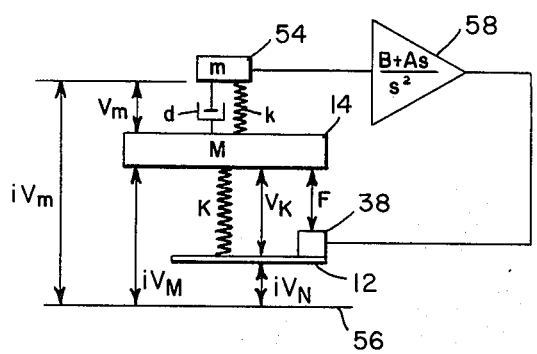
FIG. 3 is a mechanical system equivalent diagram.
Figure 4:
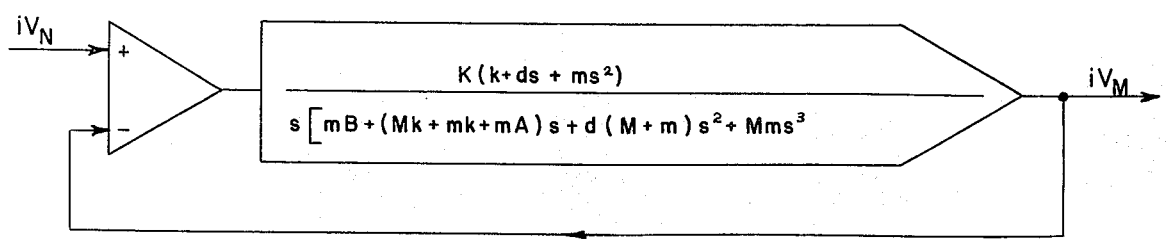
FIG. 4 is an equivalent analog computer diagram simplified in standard form.

It can be seen that, by appropriately controlling the energization of the force motors of the support members, platform 14 can be moved in any of the three translational degrees of freedom and each of the three rotational degrees of freedom. Thus, when appropriately powered, the force motors can adjust the length of the support members so that platform 14 is isolated from any vibrational motion of base 12. Accelerometer 54 is secured to platform 14 preferably directly on the axis 52 and preferably on platform bracket 32. The axis of sensitivity of accelerometer 54 is coincident with the axis 52 of the support member. Assuming that cross-coupling between support members is negligible, each accelerometer can control its own force motor on its own support member to isolate the platform from the base. A mechanical system analysis is illustrated in FIG. 3, wherein the parts of the system are related to inertial reference line 56. The output of accelerometer 54 goes to amplifier 58 to drive force motor 38. References in FIGS. 3 and 4 are as follows:

| | |
|---|---|
| m | accelerometer mass |
| k | accelerometer spring constant |
| d | accelerometer damping constant |
| $V_m$ | velocity of accelerometer with respect to platform |
| $_iV_m$ | velocity of accelerometer with respect to inertial reference |
| M | platform and load mass associated with one support member |
| K | support spring constant |
| $V_K$ | velocity of platform with respect to base |
| $_iV_M$ | velocity of platform with respect to inertial reference |
| F | force of force motor |
| $_iV_N$ | velocity of base with respect to inertial reference |
| s | La Place operator |
| B | coefficient of amplifier transfer function |
| A | coefficient of amplifier transfer function |

The mechanical schematic can be converted to an equivalent analog computer program, and that can be simplified by application of theorems from feedback system theory (see Handbook of Automation, Computation and Control, by Grabbe, Ramo and Wooldridge; John Wiley & Sons, starting page 20–62). The simplified diagram is shown in FIG. 4.

Assuming values for the constants in the simplified transfer function given in FIG. 4 as shown in the following table, the standard form transfer function can be put into a computer program which will plot the input-output steady state frequency response.

Table of Transfer Function Constants

| | Example I | Example II |
|---|---|---|
| m | .01 | .01 |
| k | 1 | 1 |
| d | .2 | .2 |
| M | 1 | 1 |
| K | 1 | 1 |
| A | $10^6$ | $10^8$ |
| B | $2 \times 10^4$ | $2 \times 10^5$ |

With constants as given in Example I, the transmission is about 1 below 0.001 hertz and is about $10^{-6}$ above 1 hertz. Using the transfer function constants given in Example II, the transmission is about 1 below about .0001 hertz and is about $10^{-8}$ above about 3 hertz. Thus, substantial isolation at reasonable frequencies can be achieved by dynamic powering of the platform by the individual force motors along the force motor axes in accordance with accelerometer input signals.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed:

1. A vibration isolator comprising:
   a base;
   a platform supported on said base;
   six support members, each support member being secured to both said base and said platform, said support members supporting said platform with respect to said base, each of said support members being at right angles to its adjacent support members, said support members being arranged in three pairs, the support members in each pair being parallel to each other, each of said support members having a motor therein connected for controlling the length of its support member;
   six accelerometers on said platform, connection means connecting each of said accelerometers to one of said motors for controlling said motors, said connection means including a functional amplifier from each said accelerometer to its corresponding motor so that when each said accelerometer senses acceleration, each said corresponding motor is energized to reduce acceleration.

2. The vibration isolator of claim 1 wherein each of said support members has an axis and the motor of each support member changes the length of its support member substantially along its axis.

3. The vibration isolator of claim 2 wherein each accelerometer is positioned on and is sensitive along the axis of its particular support member.

\* \* \* \* \*